United States Patent
Xiang (10) Patent No.: US 8,755,280 B2
(45) Date of Patent: Jun. 17, 2014

(54) METHOD FOR MAINTAINING DIFFERENTIATED SERVICES DATA FLOW AT A NETWORK DEVICE IMPLEMENTING REDUNDANT PACKET DISCARD SECURITY TECHNIQUES

(75) Inventor: Jing Xiang, Acton, MA (US)

(73) Assignee: Rockstar Consortium US LP, Plano, TX (US)

( * ) Notice: Subject to any disclaimer, the term of this patent is extended or adjusted under 35 U.S.C. 154(b) by 670 days.

(21) Appl. No.: 12/781,908

(22) Filed: May 18, 2010

(65) Prior Publication Data

US 2010/0278045 A1    Nov. 4, 2010

Related U.S. Application Data

(63) Continuation of application No. 10/611,392, filed on Jun. 30, 2003, now Pat. No. 7,746,781.

(51) Int. Cl.
*H04L 12/26* (2006.01)

(52) U.S. Cl.
USPC ....... 370/235; 370/230; 370/394; 370/395.21

(58) Field of Classification Search
USPC ............ 370/229, 235, 338, 395.21, 428, 230, 370/394; 455/432.1, 512; 709/225; 726/26
See application file for complete search history.

(56) References Cited

U.S. PATENT DOCUMENTS

| | | | | |
|---|---|---|---|---|
| 6,321,093 | B1 * | 11/2001 | Dalal | 455/512 |
| 6,978,384 | B1 * | 12/2005 | Milliken | 726/26 |
| 7,020,143 | B2 * | 3/2006 | Zdan | 370/395.21 |
| 7,161,924 | B2 * | 1/2007 | Koo et al. | 370/338 |
| 7,191,231 | B2 * | 3/2007 | Miernik et al. | 709/225 |
| 7,260,392 | B2 * | 8/2007 | Kitchin | 455/432.1 |
| 2003/0072261 | A1 * | 4/2003 | Shinagawa | 370/229 |
| 2004/0008711 | A1 * | 1/2004 | Lahti et al. | 370/428 |

\* cited by examiner

*Primary Examiner* — Brian D Nguyen
*Assistant Examiner* — Toan Nguyen
(74) *Attorney, Agent, or Firm* — Anderson Gorecki & Rouille LLP (57) ABSTRACT

An improved method is described for providing Differentiated Services (Diffserv) traffic to a node in a network that implements a security method that discards duplicate packets received at the node. The method includes the step of identifying at least two service levels to be provided to received traffic and assigning different size look-back window counts to each of the service levels. The look-back window count indicates a number of packets that have been previously received at the node that should be compared against a received packet to determine whether a duplicate packet has been received. In one embodiment, a service level that has higher priority is assigned a lower look-back window count and thus examines fewer previously received packets than a service level having a lower priority. Such an arrangement reduces the possibility that traffic having higher priority is dropped as a security measure.

14 Claims, 6 Drawing Sheets

Prior Art

METHOD FOR MAINTAINING DIFFERENTIATED SERVICES DATA FLOW AT A NETWORK DEVICE IMPLEMENTING REDUNDANT PACKET DISCARD SECURITY TECHNIQUES

This application is a continuation of U.S. application Ser. No. 10/611,392, filed Jun. 30, 2003, now issued as U.S. Pat. No. 7,746,781.

FIELD OF THE INVENTION

This invention relates generally to the field of networking and, more specifically, to the method for supporting quality of service issues in a secure network environment.

BACKGROUND OF THE INVENTION

As is known in the art, data is transferred between nodes over the Internet in the form of packets or datagrams. A packet typically consists of a header portion and a data portion. The data portion comprises a number of bytes or octets of data. There may be any minimum number of bytes in the data portion of the packet, but typical protocols also ensure that there is a maximum number of bytes of data that are transferred between each packet header. Because packets may be transmitted through different routes in the network to a destination node, they may reach the destination node out of order. Under the Transmission Control Protocol (TCP)/IP protocol and other protocols a sequence number is assigned to each packet to enable the destination node to restore the order of packets in the data transmission.

Figure 1:
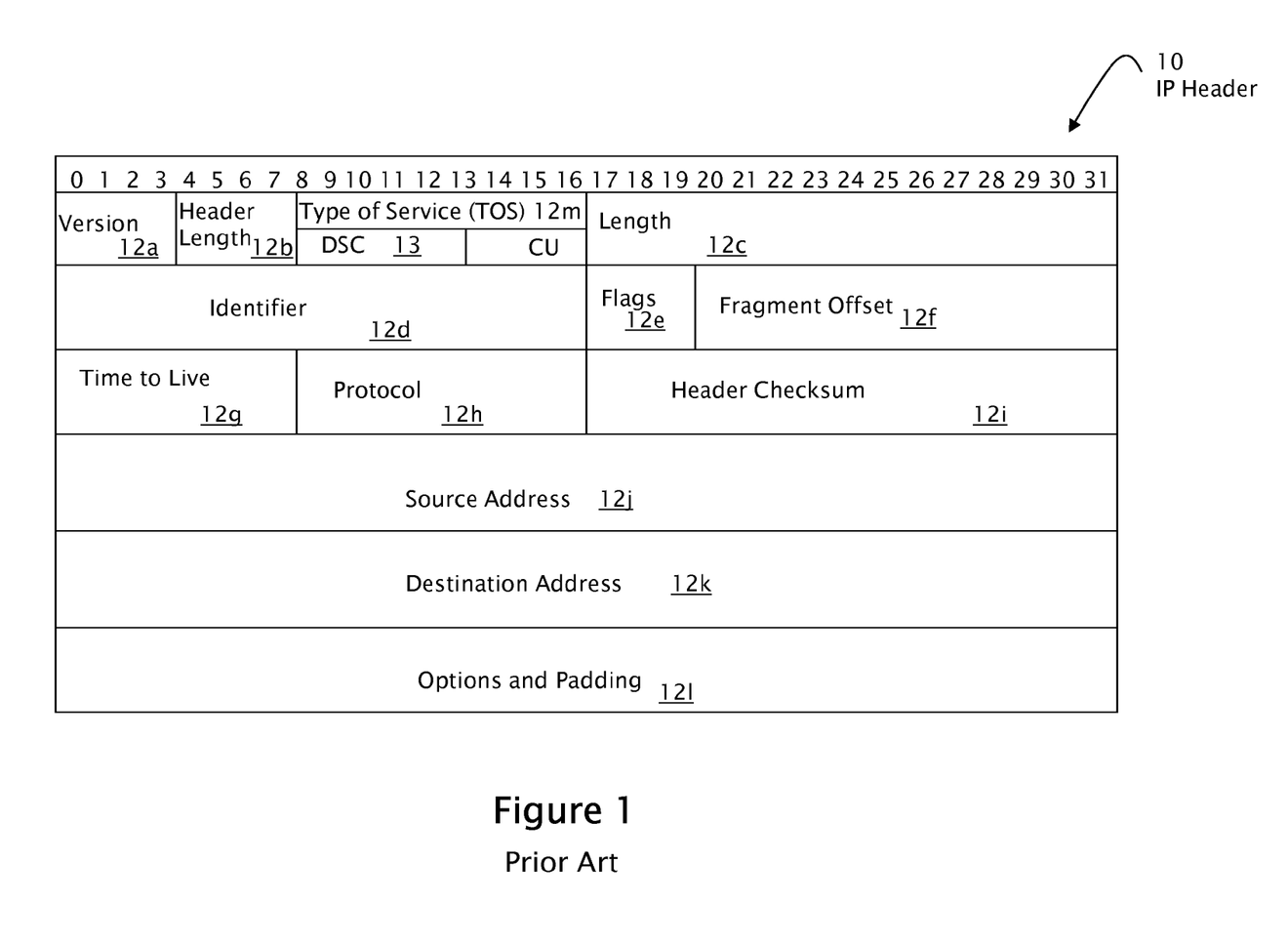
FIG. 1 is a diagram illustrating various fields of a header according to the Internet Protocol.

Referring now to FIG. 1, an exemplary definition of fields of an Internet Protocol (IP) packet header includes a number of fields that control how the data associated with the header is to be treated at a source and destination node. Exemplary fields include the source address 12*j* and the destination address 12*k*, which include the IP addresses of the communicating nodes. In addition, the IP header includes a version field 12*a* which identifies which version of the IP protocol should be used when parsing the IP header, and a protocol field 12*h* which identifies what other protocols are layered on top of the IP protocol. For example, certain protocols such as Transmission Control Protocol (TCP) include their own header, and the encoding of the TCP protocol in the protocol field alerts the destination node to interpret a portion of the data as a TCP header.

Another field in the IP header is the Type Of Service (TOS) field 12*m*. In the IP protocol, the TOS identifies the quality of service that should be afforded a given transmission between the identified source and destination nodes. For example, the field may be encoded to indicate a relative priority of the transmission; high priority transmissions would be given precedence over low priority transmissions at each of the source and destination nodes.

In version IPv4 and IPv6 of the IP protocol a replacement header field, called the Differentiated Services Code (DSC) field 13, is defined, which supersedes the definition of the IP TOS octet. Differentiated Services (generally referred to as Diffserv by the art), enables different Per Hop Behaviors (PHBs) to be experienced at different nodes for different types of traffic. Traffic having a certain type of per hop behavior are said to belong to a particular behavior aggregate. Diffserv thus allows a network subscriber to control the quality of service (QOS) that is associated with their traffic by entering into a service level agreement to obtain the desired behavior of traffic at certain nodes. Generally speaking, there is a correlation between the value in the DSC field and the per hop behavior desired for the data encapsulated in the data field of the corresponding packet, and the per hop behavior is the means by which a node allocates resources to the behavior aggregate. There can be a variety of different types of traffic between a common source and destination, each of which may have different per hop behaviors and therefore each of which has different access rights to the resources (buffers, etc.) of the destination node.

While there are many possible per hop behaviors, certain per hop behaviors have been defined in the art. These per hop behaviors include Best Effort Forwarding (BE), Assured Forwarding (AF) and Expedited Forwarding (EF).

Best Effort (BE) per hop behavior is the default per hop behavior of Diffserv. BE behavior aggregate packets may be sent into a network without adhering to any particular rules and the network will deliver as many of these packets as possible and as soon as possible, subject to other resource policy constraints. The reasonable implementation of this per hop behavior would be to forward packets in this aggregate whenever the output link is not required to satisfy another per hop behavior. A reasonable policy for constructing services ensures that the behavior aggregate was not starved by allowing some accesses to the resources.

Traffic that is forwarded as part of the Assured Forwarding (AF) behavior aggregate is forwarded with a high probability that it will reach the destination node as long as the aggregate traffic from each site does not exceed a subscribed threshold. For example, in a typical application, a company uses the Internet to interconnect its geographically distributed sites and wants an assurance that IP packets within this intranet are forwarded with high probability as long as the aggregate traffic from each site does not exceed the subscribed information rate (profile). Different levels of Assured Forwarding (AF) PHB group behavior may be offered by a service provider to meet the required bandwidth and cost associated with the customer.

Expedited Forwarding provides the highest priority per hop behavior. The intent of the Expedited Forwarding PHB is to provide a building block for low loss, low jitter and low delay services. The dominant causes of delay in packet network are set propagation delays in wide area links and tuning delay in switching and routers. Since propagation delays are a set property of the topology, delay can be minimized when queuing delays are minimized. The intent of the expedited forwarding per hop behavior is to provide a behavior in which suitably marked packets usually encounter short or empty queues. If queues remain short relative to buffer space available, packet loss is also kept to a minimum. An additional characteristic that may be EF or AF PHBs requirement is that the data packets often must be received in the order that they are transmitted.

A protocol that may be layered on top of the IP protocol is the Internet Protocol Security (IPsec) protocol. Internet Protocol Security (IPsec) is a security protocol that provides security services at the IP layer by enabling a system to select required security protocols, determine the algorithm(s) to use for services, and put in place any cryptographic keys required to provide the requested services. IPsec can be used to protect one or more paths between a pair of hosts, between a pair of secure gateways, or between a security gateway and a host. The set of security services that IPsec can provide include access control, connectionless integrity, data origin authentication, limited traffic flow confidentiality, and the rejection of replayed packets (a form of partial sequence integrity).

Figure 2:
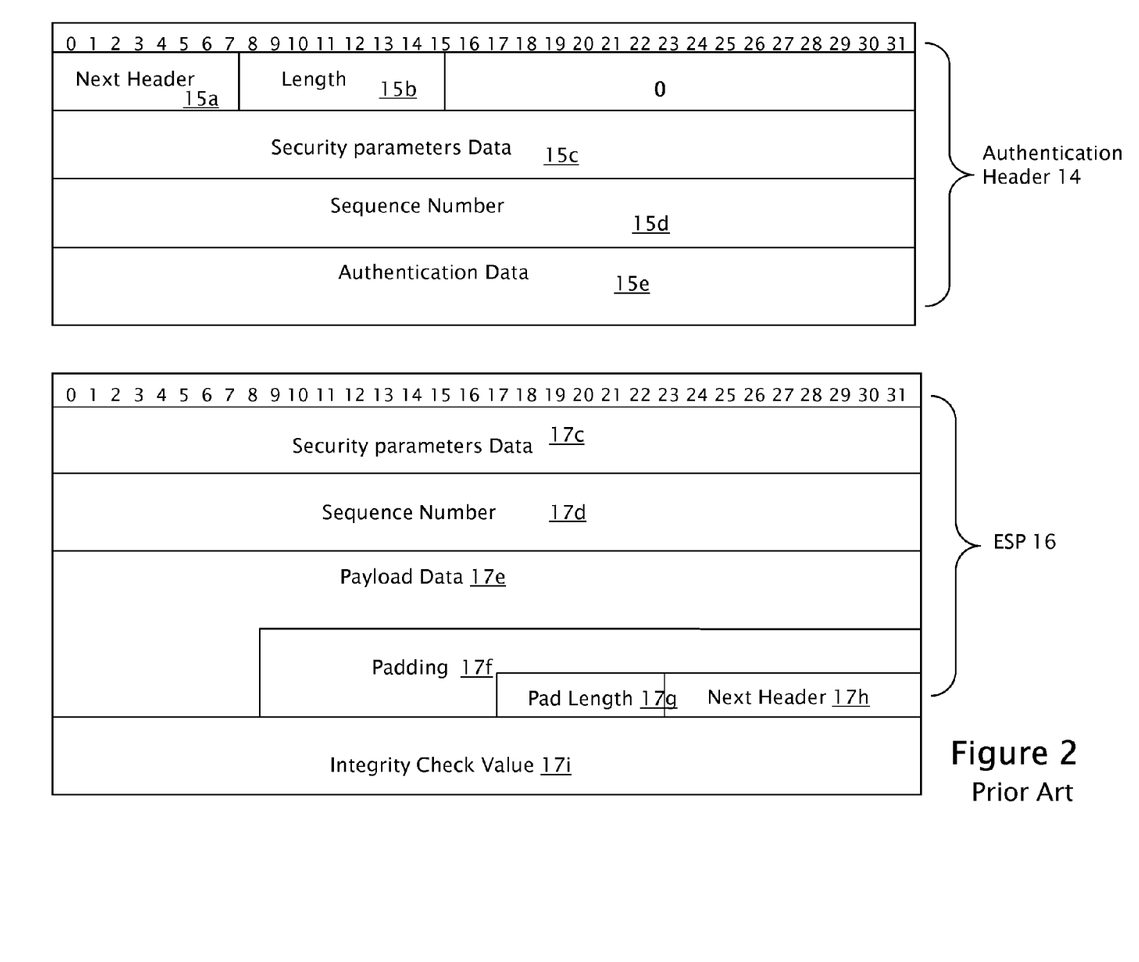
FIG. 2 is a diagram illustrating various fields that are included in an Authentication Header (AH) in the Internet Protocol Security (IPsec) protocol.

One element of the IPsec protocol is the use of the Authentication Header (AH) 14. as shown in FIG. 2. The IP Authentication Header is used to provide connectionless integrity and data origin authentication for IP datagrams, and to provide protection against replays. AH offers an anti-replay (partial sequence integrity) service at the discretion of the receiver, to help counter denial of service (DoS) attacks. A DoS attack is a type of attack on a network that is designed to bring the network to its knees by flooding it with useless traffic. Many DoS attacks, such as the Ping of Death and Teardrop attacks, exploit limitations in the TCP/IP protocols. The anti-replay mechanism seeks to overcome DoS attacks by assigning examining sequence number 15*d* of received packets, and dropping any packets having duplicate sequence numbers within a predefined window of time. As shown in FIG. 2, the sequence number 15*d* comprises 32 bits, and is used as a counter for the data packets associated with the secure transmission. Typical implementations do not allow duplicate sequence numbers to appear within a thirty two bit window, and therefore use five bits of the counter, before resetting to provide a new sequence number. In order to prevent DoS attacks, the anti-replay mechanism deletes packets having duplicate sequence numbers within the thirty-two packet window.

Figure 3:
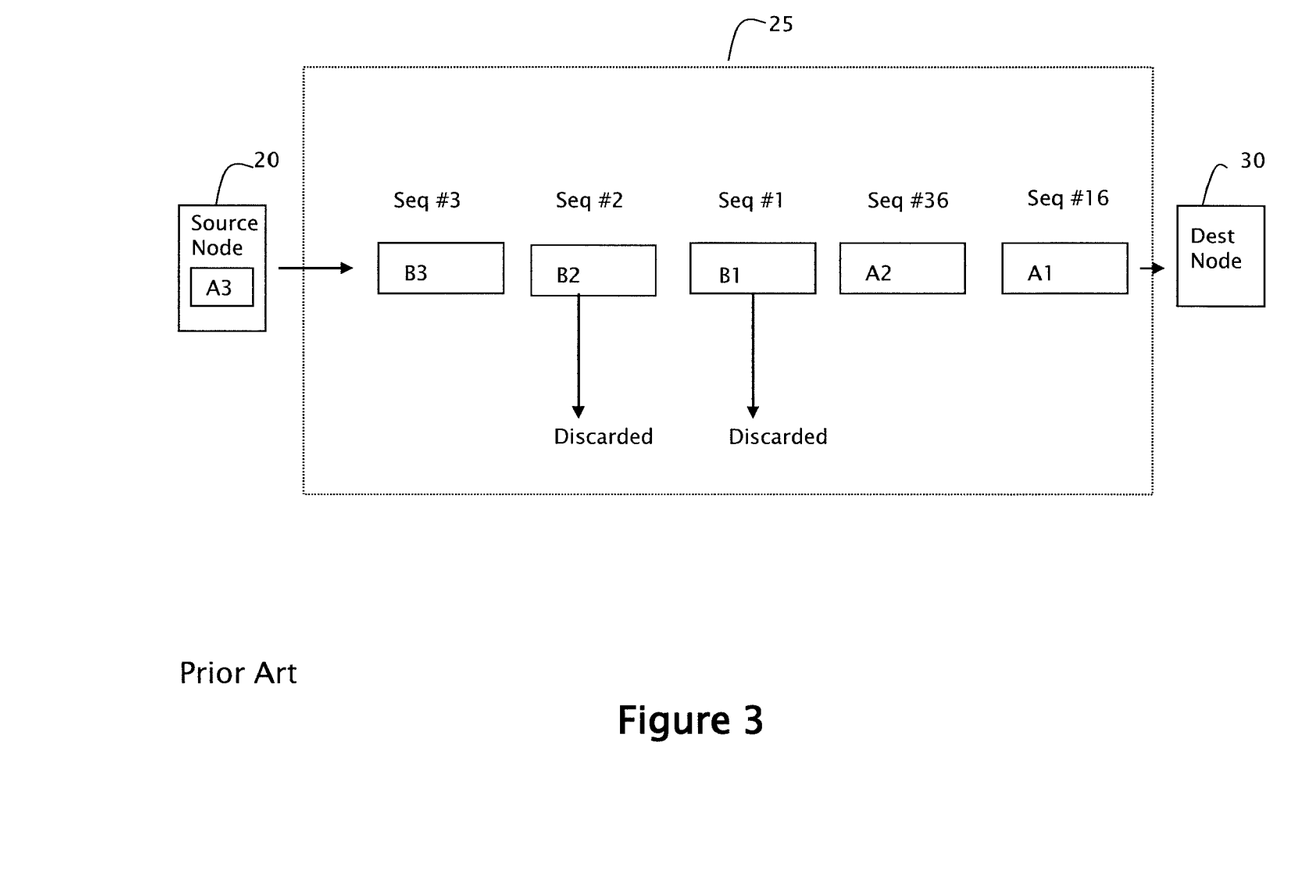
FIG. 3 is a packet flow diagram for illustrating how packets that are part of Diffserv traffic are frequently dropped at nodes operating using the anti-replay mechanism of the IPsec protocol.
Figure 4:
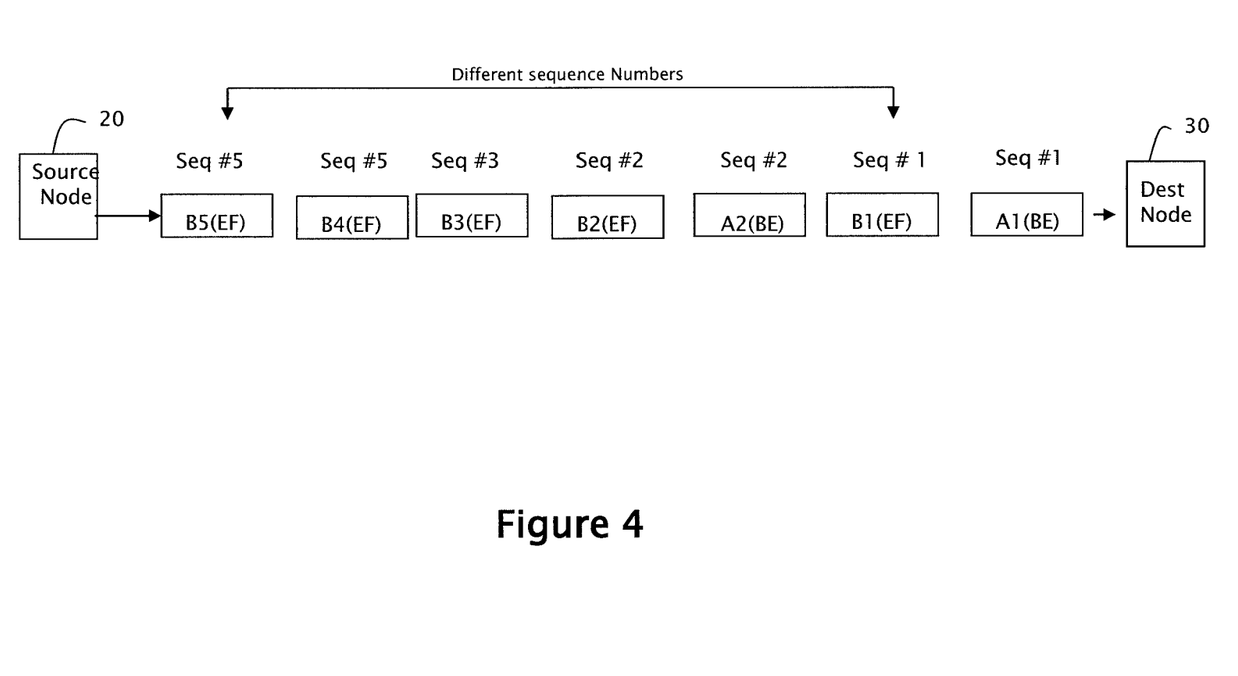
FIG. 4 is a conceptual block diagram of certain components that may be included in hardware or software at a host node operating according to the present invention.

Referring now to FIG. 3, an exemplary Diffserv data flow is shown, wherein the IP packets may have layered thereon an Authentication Header for IPsec purposes, including sequence numbers. A first traffic stream is shown to include packets A1, A2 and A3, and a second traffic stream is shown to include packets B1, B2, B3. Source node 20 transmits both traffic streams to destination node 30. In the example of FIG. 3, assume that data transmission A, comprising packets A1, A2 and A3 are packets comprising the BE PHB aggregate, and transmission B, comprising packets B1, B2 and B3 are packets comprising an EF PHB aggregate. Source node 20 initiates the transmission of traffic stream A over the Internet 25 by forwarding packets A1 and A2 to destination node 30. As the packets are transmitted, they are assigned sequence numbers 1 and 2 respectively. Subsequent to the transmission of packets A1 and A2, data traffic belonging to the Expedited Forwarding per hop behavior aggregate is received at the source node 20. To implement the EF PHB for traffic stream B, the source node immediately substitutes the traffic stream B in its transmissions to destination node 30. Packet B1 is assigned sequence number 1, packet B2 is assigned sequence number 2, and packet B3 is assigned sequence number 3, and all packets are forwarded to the destination node. Following the transmission of packet B3 to the destination node, the final packet A3 of the first transmission can be forwarded to the destination node. Within a four packet transmission period, two packets have identical sequence numbers (packet A1 and B1 have matching sequence number 1, and packets A2 and B2 have matching sequence number 2). Typically the destination node will look to other characteristics of the packet, such as protocol, the DSC fields, and other identifying elements to arrange the appropriate packets with the appropriate transmission streams.

A problem arises, however, at the destination node due to the anti-replay mechanism of the IPsec protocol, because when packet B1 having the sequence number of 1 is received at the destination node it will be dropped since the duplicate sequence number potentially indicates a DoS attack. Thus, the contracted EF PHB for traffic stream B is not achieved. It would be desirable to determine a method of implementing Diffserv in networks having nodes operating using the IPsec protocol.

SUMMARY OF THE INVENTION

An improved method is described for providing Differentiated Services (Diffserv) traffic to a node in a network that implements a security method that discards duplicate packets received at the node. The method includes the step of identifying at least two service levels to be provided to received traffic and assigning different size look-back window counts to each of the service levels. The look-back window count indicates a number of packets that have been previously received at the node that should be compared against a received packet to determine whether a duplicate packet has been received. In one embodiment, a service level that has higher priority is assigned a lower look-back window count and thus examines fewer previously received packets than a service level having a lower priority. Such an arrangement reduces the possibility that traffic having higher priority is dropped as a security measure.

DESCRIPTION OF THE PREFERRED EMBODIMENT

A method and apparatus for supporting differentiated services (Diffserv) traffic at nodes that implement redundant packet discard security measures to prevent Denial Of Service (DoS) attacks will be described with reference to the attached Figures and below specification.

Figure 5:
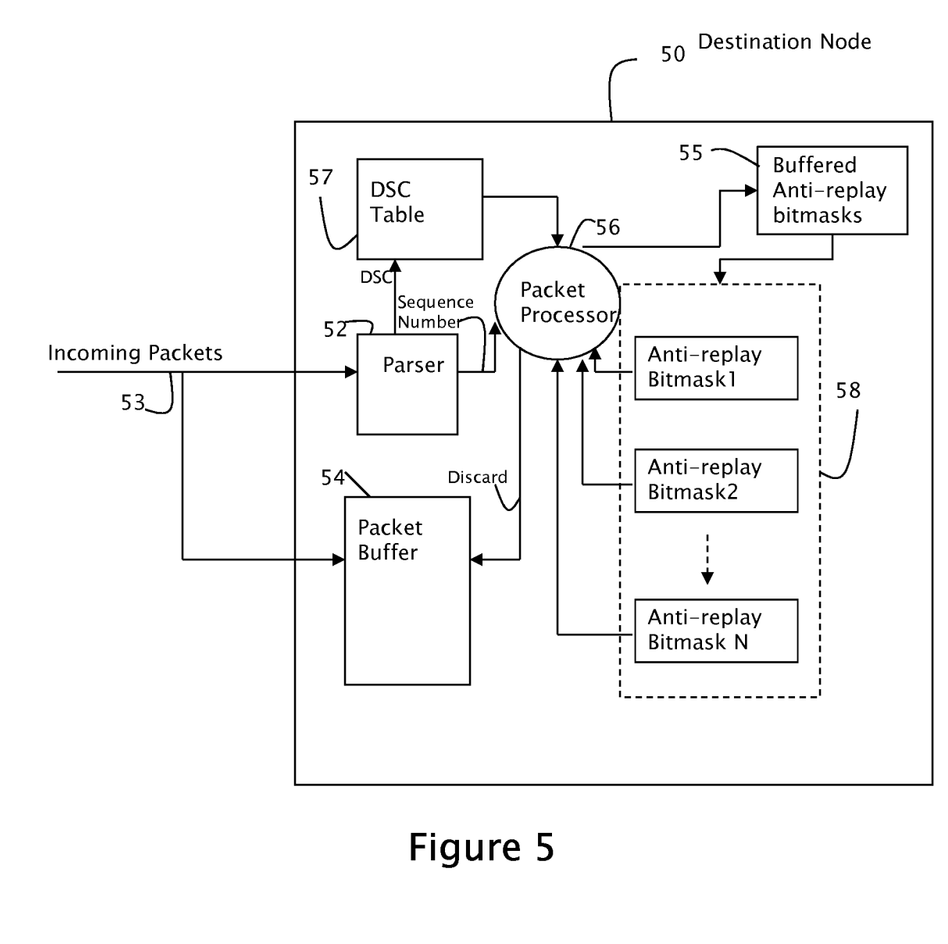
FIG. 5 is a packet flow diagram for illustrating how offering differing size windows according to the present invention reduces the instances of discard of Diffserv packets in systems operating under the IPsec protocol.

Referring now to FIG. 5, some basic components of a networked node 50 are shown to include a packet processor 56, a parser 52 and a packet buffer 54. Although the components are shown as functional blocks, it should be understood that the functionality described with regard to each of the components may be implemented in either software, hardware, or a combination thereof, and the present invention is not limited to any specific implementation.

In general, the networked node receives incoming packets on line 53, and forwards the packets for temporary storage in the packet buffer 54. The packet processor 56, among other things, determines whether the packet stored in the buffer should be forwarded to memory (not shown) for further processing or to an output path (not shown) of the node. In addition, the packet processor sends signals to the packet buffer if it is determined that the packet should be discarded. The focus of the present invention will be specifically on the redundant packet discard security measure that is often performed to minimize DoS attacks at a node. One example of a redundant packet discard security measure is the anti-replay mechanism of the Internet Protocol Security (IPsec) protocol. It should be understood that although the present invention is described with regard to certain elements of the IPsec protocol, the present invention is not limited to operation under any specific protocol.

According to one aspect of the present invention, a table of look-back window sizes 58 is provided. Each look-back window size is associated with a defined per hop behavior aggregate, such as Best Effort (BE), one of a set of Assured Forwarding (AF) per hop behaviors, Expedited Forwarding (EF) or the like. When an input packet is received at the node, the DSC field is parsed from the IP header and forwarded to the Diffserv codepoint (DSC) table 57 to determine the contracted level of service associated with the traffic stream. There is a correlation between the DSC and the per hop behavior, although it may not be a one-to-one mapping, and other considerations, such as the type of packet as indicated in the identifier field 12d of the IP header, the IP addresses of the source and destination nodes, the protocol associated with the specific packet (as identified in field 12h), and other factors may be used to map the packet to one of a set of per hop behavior (PHB) aggregates. The present invention recognizes that there may be many PHBs defined from many input fields of the packet, and the present invention should not be limited to any specific PHBs or methods for determining PHB aggregates. The alternative term of 'service level' will be used interchangeably hereinafter with the term per hop behavior aggregate.

Logic at the node 50 operates generally as follows. When a packet is received at the node, the parser 52 strips the DSC field and the sequence number from the respective IP and Authentication headers. The DSC field is used to obtain a portion of the per hop behavior mapping information, which is forwarded to the packet processor 56. The packet processor retrieves the look-back window size for the PHB from the replay window table 58. The packet processor uses the window size to determine how many previous sequence numbers should be compared with the current sequence number to find a match. If a match is found within this window, the current packet is discarded because it is a potential DoS attack. If no match is found, the packet is processed in accordance with the remaining fields of the IP header.

For example, referring now to FIG. 5, assume that a node is implementing a security protocol that drops duplicate packets, but that the traffic that flows through the network is Diffserv traffic having a variety of service levels. Using known Diffserv terminology, assume that the traffic includes packets having Expedited Forwarding (EF) service levels, one Assured Forwarding (AF) service level, and a default Best Effort (BE) service level. Data traffic having EF service level has a look-back window size of eight sequence numbers/packets, while data having AF service level has a look-back window of twelve sequence numbers/packets, and data having BE service level has a look-back window of thirty two packets/sequence numbers.

Figure 6:
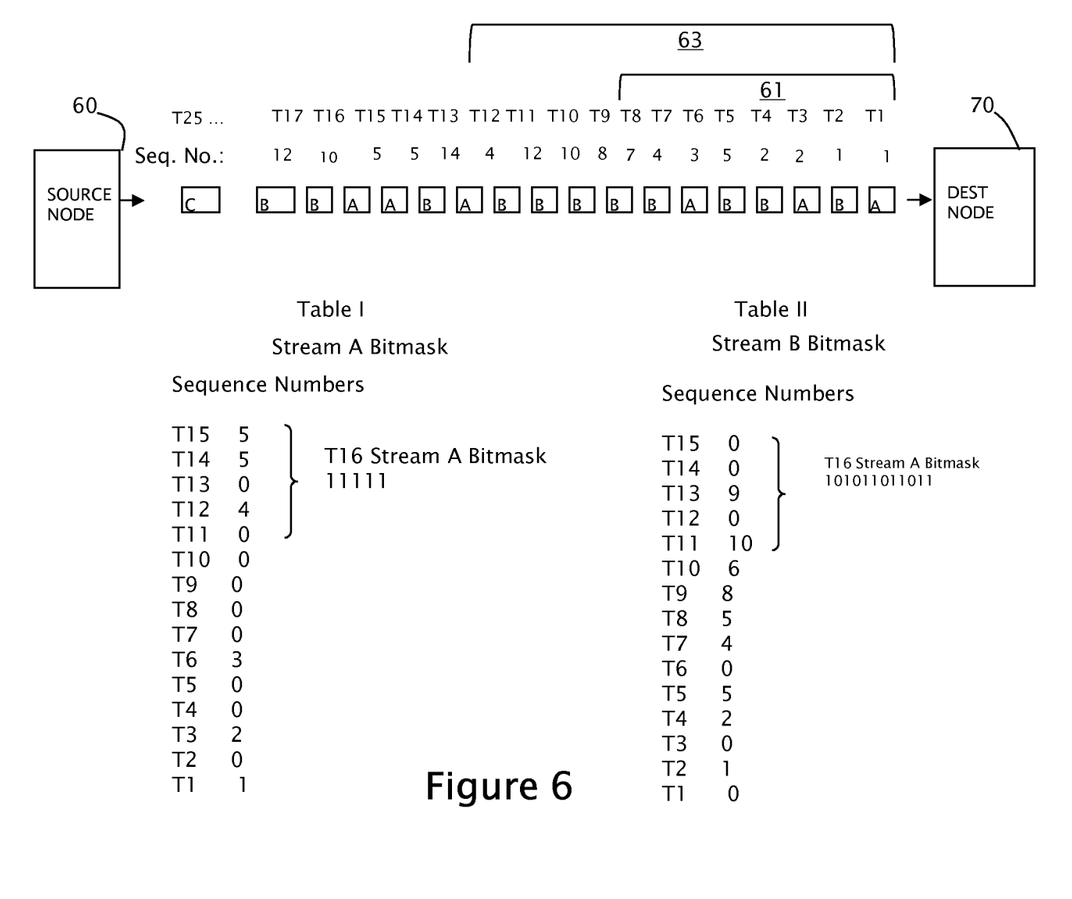
FIG. 6 is a block diagram of a sequence number buffer illustrating various window sizes that are assigned to various service levels according to the 5 present invention.

In FIG. 6, source node 60 is transmitting a series of traffic streams A, B and C to destination node 70. Individual packets will be referred to hereinafter by their respective stream designations in combination with their sequence numbers (for example, packet B1 forwarded at time T16, packet A12 forwarded at time T12, etc.). Traffic stream A has a contracted Best Effort service level, traffic stream B has an Assured Forwarding service level, and traffic stream C has an Expedited Forwarding service level.

At time T1, packet A1 is transferred to destination node 70. The transmission of traffic stream A continues until time T16, when the source node receives a higher priority traffic stream B. When the destination node receives packet B1, the packet processor examines the DSC field and other information in the IP header to determine the service level/PHB of the packet. As mentioned above, the service level of traffic stream B is AF. Once the service level/PHB has been identified, the associated look-back window size is selected from the window table 58. When the look-back size is determined the node examines the sequence numbers that are associated with packet in the predefined window to determine whether a match is made. Referring briefly to FIG. 6, in one embodiment the sequence numbers of accepted packets are stored in the sequence number buffer 55, which is a first in first out (FIFO) buffer. When examining the FIFO 55, only those sequence numbers within the window are examined for the match. For example, in FIG. 6 only those sequence numbers in window 61 are examined for higher priority traffic, only the sequence number in window 63 are examined for mid-priority traffic, and all sequence numbers are examined for default priority traffic. Any known method of quickly determining whether or not there is a match between the numbers can be used. As new sequence numbers are received, remaining sequence numbers are pushed down the buffer until eventually they are overwritten, or fall out of the buffer. The length of the sequence number buffer should correspond to the maximum look-back window size.

Referring back to FIG. 5, when packet B1 is received, the sequence numbers of the previous twelve packets are examined for a match. In the example of FIG. 5, there is no match, and the packet is not discarded. The transmission of stream B continues until at time T25 the source node 60 starts to forward a third traffic stream C. In the example of FIG. 5, traffic stream C is high priority EF service level traffic, and thus has a look-back window of only eight packets. The sequence numbers of packets B2-B9 are compared against the sequence number of packet C1, and as there is no match, the packet is not discarded.

Thus, a method and apparatus has been shown and described wherein different size windows are associated with different priority traffic to ensure that the packets are not discarded due to redundant packet dropping security levels. Although certain sizes have been disclosed above, it should be noted that the present invention is not limited to any specific look-back window size. Various considerations have to be made by a user when making the decision for sizing, such as the type of traffic generally seen at the node, the service levels offered by the service provider, loading considerations at the node, and a variety of other considerations.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method of determining whether to discard a received packet at a node, the method comprising the steps of:
    responsive to a service level associated with the received packet, selecting a number from at least two available numbers, wherein the number identifies a number of previously received packets and wherein the at least two available numbers are different;
    comparing a sequence number associated with the received packet against sequence numbers associated with the selected number of previously received packets; and
    discarding the received packet in the event of a match between any one of the sequence numbers associated with the selected number of previously received packets and the sequence number associated with the received packet.

2. The method of claim 1, wherein the service level is determined in response to a differentiated services codepoint associated with the packet.

3. The method of claim 1, wherein there are at least two service levels and wherein one of the at least two available numbers corresponding to a higher priority service level is less than another one of the at least two available numbers corresponding to a lower priority service level.

4. The method according to claim 3, wherein at least one of the service levels corresponds to an Expedited Forwarding (EP) per hop behavior.

5. The method according to claim 3, wherein at least one of the service levels corresponds to an Assured Forwarding (AF) per hop behavior.

6. The method according to claim 3, wherein at least one of the service levels corresponds to a Best Efforts (BE) per hop behavior.

7. The method of claim 1, wherein the step of discarding the received packet in the event of a match is performed in accordance with an Internet Protocol Security (IPsec) anti-replay mechanism.

8. An apparatus for discarding redundant packets received at an input interface, comprising:
   a sequence number buffer, for storing sequence numbers associated with packets received at the input interface;
   a look-back window table, comprising at least two entries, each entry associated with a service level and storing a number representing a number of previously received packets to be compared in determining whether to discard a received packet; and
   a packet processor which selects, responsive to a service level associated with the received packet, a number from the at least two entries, wherein the number identifies a number of previously received packets and wherein the at least two entries are different.

9. The apparatus of claim 8, wherein one of the entries of the look-back window table is associated with an Expedited Forwarding (EF) service level.

10. The apparatus of claim 8, wherein one of the entries of the look-back window table is associated with an Assured Forwarding (AF) service level.

11. The apparatus of claim 8, wherein one of the entries of the look-back window table is associated with a Best Effort (BE) service level.

12. The apparatus of claim 8, wherein the apparatus operates according to an Internet Protocol Security (IPsec) protocol.

13. An apparatus comprising:
   a destination node with a packet processor and non-transitory memory configured for comparing a sequence number of a received packet against a set of sequence numbers of previously received packets to determine whether there is a match, wherein a number of sequence numbers included in the set varies according to a service level of the received packet and is selected from at least two available numbers, the destination node discarding the received packet in the event of a match between any one of the sequence numbers associated with the previously received packets and the sequence number associated with the received packet.

14. The apparatus of claim 13, wherein the number decreases as a priority level of the service level increases.

* * * * *